(12) United States Patent
Mizuta (10) Patent No.: US 8,303,029 B2
(45) Date of Patent: Nov. 6, 2012

(54) UTILITY VEHICLE

(75) Inventor: Fumio Mizuta, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 422 days.

(21) Appl. No.: 12/619,525

(22) Filed: Nov. 16, 2009

(65) Prior Publication Data

US 2011/0115260 A1 May 19, 2011

(51) Int. Cl.
*B60K 37/00* (2006.01)
*B62D 25/08* (2006.01)
*B62D 25/12* (2006.01)
*B62D 25/24* (2006.01)

(52) U.S. Cl. .............. 296/193.09; 296/192; 296/193.11; 296/70; 180/69.21; 362/496

(58) Field of Classification Search .............. 296/181.2, 296/190.03, 192, 193.02, 193.09, 193.11, 296/203.02, 70; 280/756; 180/69.21; 362/496
See application file for complete search history.

(56) References Cited

U.S. PATENT DOCUMENTS

| | | | | |
|---|---|---|---|---|
| 1,743,395 A * | 1/1930 | Rinehart | ...................... | 454/123 |
| 3,064,748 A * | 11/1962 | Hill | ........................... | 180/69.21 |
| 4,437,529 A * | 3/1984 | Fralish | ........................ | 180/69.2 |
| 5,101,921 A * | 4/1992 | West et al. | .................. | 180/69.21 |
| 5,307,248 A * | 4/1994 | Wenzlick | ...................... | 362/496 |
| 5,435,406 A * | 7/1995 | Gaffoglio et al. | ........... | 180/69.21 |
| 5,730,239 A * | 3/1998 | Holter | .......................... | 180/69.21 |
| 5,782,312 A * | 7/1998 | Murakawa | ..................... | 180/69.2 |
| 5,791,428 A * | 8/1998 | Noll et al. | .................... | 180/69.21 |
| 6,003,204 A * | 12/1999 | Roach et al. | ..................... | 16/267 |
| 6,460,916 B2 * | 10/2002 | Mizuta | ........................ | 296/182.1 |
| 7,558,658 B2 * | 7/2009 | Kuramoto et al. | .............. | 701/50 |
| 7,571,952 B1 * | 8/2009 | Hamaguchi et al. | ........ | 296/183.2 |
| 7,677,343 B2 * | 3/2010 | Kitai et al. | .................. | 180/89.17 |
| 2008/0035406 A1 * | 2/2008 | Kitai et al. | ..................... | 180/247 |
| 2009/0206627 A1 * | 8/2009 | Duplantis et al. | ............... | 296/72 |
| 2010/0096202 A1 * | 4/2010 | Bonsen | ....................... | 180/69.21 |
| 2010/0194136 A1 * | 8/2010 | Shiratori et al. | ................ | 296/70 |
| 2011/0108343 A1 * | 5/2011 | Mizuta | ......................... | 180/69.2 |
| 2011/0115259 A1 * | 5/2011 | Mizuta | ...................... | 296/193.11 |
| 2011/0272202 A1 * | 11/2011 | Kawashiri et al. | ......... | 180/69.21 |
| 2011/0298189 A1 * | 12/2011 | Schneider et al. | ........... | 280/80.1 |
| 2011/0314953 A1 * | 12/2011 | Nakamura et al. | .............. | 74/493 |
| 2012/0032431 A1 * | 2/2012 | King | .............................. | 280/756 |
| 2012/0056411 A1 * | 3/2012 | Nakamura et al. | ............ | 280/756 |

FOREIGN PATENT DOCUMENTS

JP 2001-191958 7/2001

* cited by examiner

*Primary Examiner* — Jason S Morrow
(74) *Attorney, Agent, or Firm* — Alleman Hall McCoy Russell & Tuttle LLP (57) ABSTRACT

A utility vehicle includes a vehicle body frame, a cabin frame coupled to an upper portion of the vehicle body frame, a cover coupled to the vehicle body frame so as to cover an instrument panel in front of a driver seat, and a hood. The hood is configured to cover a space between a pair of right and left front wheels from above in front of the cover and is pivotable around a front end portion thereof so as to open and close. A rear end portion of the hood is fitted to a front end portion of the cover and a rear end of the hood is located in front of a front end of the cabin frame, in a state where the hood is in a closed position.

8 Claims, 13 Drawing Sheets

UTILITY VEHICLE

TECHNICAL FIELD

The present invention relates to a utility vehicle which is suitable for driving off-road.

BACKGROUND ART

A utility vehicle for driving off-road is typically four-wheel drive. The utility vehicle is provided with a hood at the front portion of a vehicle body, seats in the vicinity of the center of the vehicle body and a cargo bed at the rear portion of the vehicle body. The hood covers a space between front wheels to protect instruments such as a suspension unit for front wheels accommodated in the space. A seat space in which the seats are arranged is surrounded by a cabin frame coupled to a vehicle body. To this end, coupling members are mounted to the vehicle body to couple the cabin frame to the vehicle body. To be specific, the coupling members coupled to the rear end portion of the cabin frame protrude upward from the vehicle body behind the seats, and the coupling members coupled to the front end portion of the cabin frame protrude from the vehicle body upward through an opening of the hood. In this structure, to open the space covered with the hood, it is necessary to pivot the hood upward along the coupling members and the cabin frame in such a manner that the coupling members and the cabin frame pass through the opening.

In the utility vehicle, to facilitate a maintenance operation for the instruments arranged in the space between the front wheels, the hood may be pivotable so as to open and close the space. Since the coupling members and the cabin frame are arranged at the front portion of the vehicle, it is necessary to pivot the hood while avoiding interference between the hood and the coupling members and the cabin frame.

SUMMARY OF THE INVENTION

A utility vehicle of the present invention comprises: a vehicle body frame; a cabin frame coupled to an upper portion of the vehicle body frame; a cover coupled to the vehicle body frame so as to cover an instrument panel in front of a driver seat; and a hood which is configured to cover a space between a pair of right and left front wheels from above, in front of the cover, and is pivotable around a front end portion thereof so as to open and close; wherein a rear end portion of the hood is fitted to a front end portion of the cover and a rear end of the hood is located in front of a front end of the cabin frame, in a state where the hood is in a closed position.

In accordance with such a configuration, since the rear end of the hood in the closed position is located in front of the front end of the cabin frame and the hood is pivoted around the front end portion thereof to open and close, it is possible to avoid interference between the hood and the cabin frame when opening and closing the hood.

The above and further objects, features and advantages of the present invention will more fully be apparent from the following detailed description of preferred embodiments with accompanying drawings.

DETAILED DESCRIPTION OF THE PREFERRED EMBODIMENTS

Hereinafter, an embodiment of the present invention will be described with reference to the drawings. As used herein, the direction is referenced from the perspective of a driver (not shown) seated in a utility vehicle.

Figure 1:
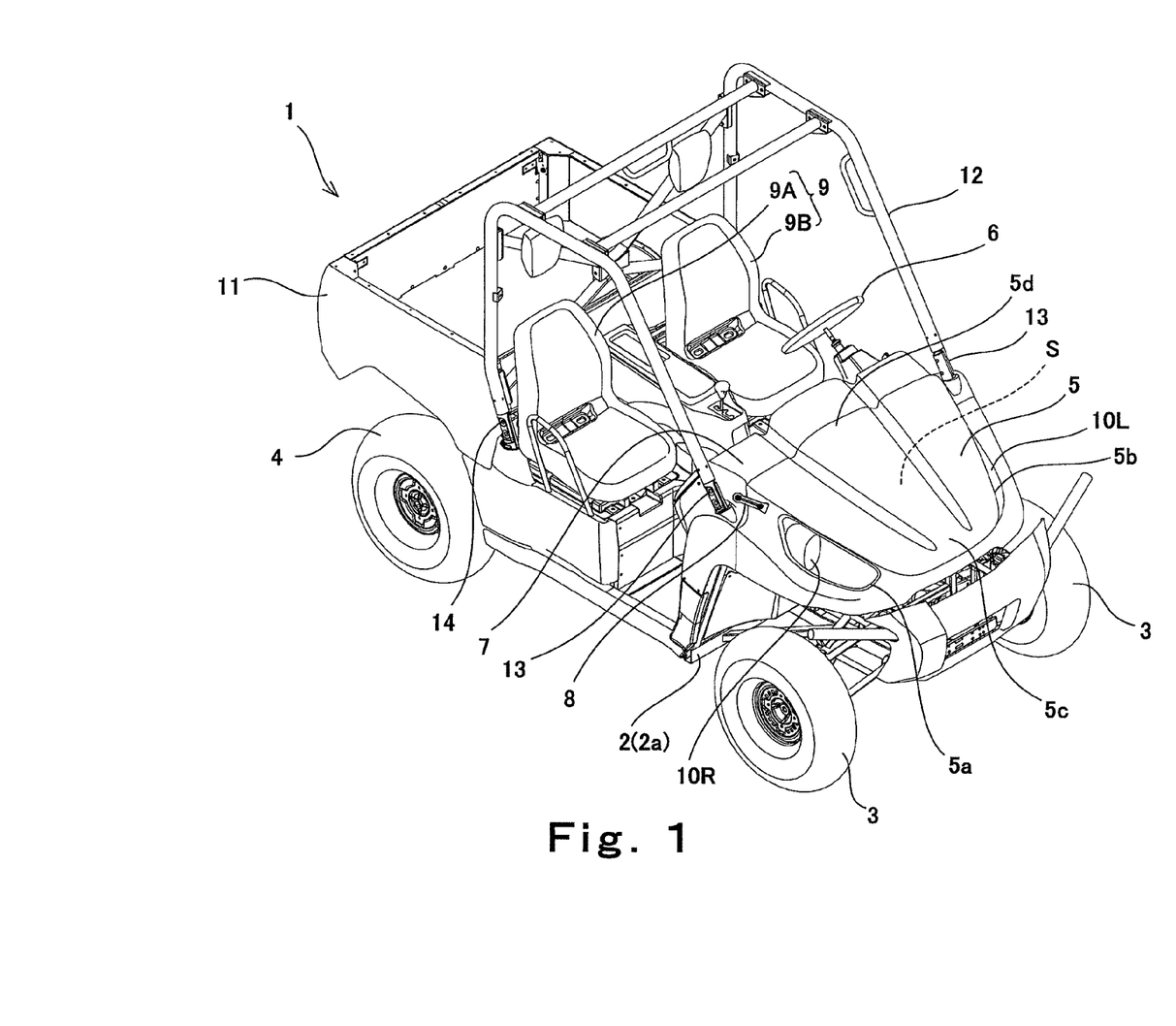
FIG. 1 is a perspective view of a utility vehicle according to an embodiment of the present invention.

FIG. 1 is a perspective view of a utility vehicle 1 according to an embodiment of the present invention. The utility vehicle 1 includes a pair of right and left front wheels 3 at the front portion of a vehicle body frame 2 and a pair of right and left rear wheels 4 at the rear portion of the vehicle body frame 2. A space S between the right and left front wheels 3 is covered with a hood 5 from above. The hood 5 is made of resin. The resin-made hood 5 is flexible, lightweight and can be formed to have a desired complex shape, as compared to a steel-made hood. The hood 5 is provided with a pair of openings 5a and 5b at right and left sides, respectively. A pair of head lamp devices 10R and 10L which are elongated in the forward and rearward direction are mounted to the openings 5a and 5b, respectively.

A rear end portion 5d of the hood 5 has a larger width in a rightward and leftward (vehicle width) direction of the vehicle body than a front end portion 5c of the hood 5. The hood 5 is pivotable around the front end portion 5c thereof so as to open and close. A cover 7 is provided in front of the seats 9 described later so as to cover an instrument panel 65 (see FIG. 2) on which a handle 6 or gauges are arranged. The rear end portion 5d of the hood 5 in a closed position is joined to a front portion 7b (see FIG. 2) of the cover 7 from above. The hood 5 in the closed position is retained by stopper mechanisms 8 such that its attitude is maintained.

A pair of right and left seats 9 (driver seat 9B and passenger seat 9A) are provided behind the hood 5 to be located in the vicinity of the center of the vehicle body in the forward and rearward direction. A cargo bed 11 is provided behind the seats 9. The cargo bed 11 extends rearward from a location which is in close proximity to the rear portion of the seats 9 through a region above the rear wheels 4.

A cabin frame 12, which is a so-called rollover protective structure (ROPS), is coupled to the vehicle body frame 2 so as to surround the seat space in which the seats 9 are arranged. The vehicle body frame 2 is provided with branch-shaped coupling members 13 and 14, i.e., the coupling members 13 at right and left front locations and the coupling members 14 at right and left rear locations, are provided to couple the cabin frame 12 to the vehicle body. The two front coupling members 13 penetrate through the cover 7 and protrude upward, while the two rear coupling members 14 are arranged between the seats 9 and the cargo bed 11. The cabin frame 12 is provided to extend from the both end portions of the cover 7 to a region behind the seats 9. With the hood 5 being in the closed position, the rear end portion 5*d* of the hood 5 is fitted to the front end portion 7*b* of the cover 7, and is located in front of the two front coupling members 13 and the front end of the cabin frame 12. Therefore, the hood 5 is openable and closable without interfering with the cabin frame 12.

The cabin frame 12 is formed by a cylindrical pipe which is made of metal. The cabin frame 12 surrounds the seat space and is open forward and rearward, rightward and leftward, and upward. The cabin frame 12 serves to protect the driver and the passenger and is used as a mounting member by which a roof or a hood for blocking rain or sunshine is mounted. That is, the utility vehicle 1 has no doors and no front glass. An engine unit (not shown) for driving the front wheels 3 and 4, an electric power supply unit (not shown) for supplying electric power to electric devices such as the head lamp devices 10R and 10L and the gauges, etc., are built into a space below the seats 9.

Figure 2:
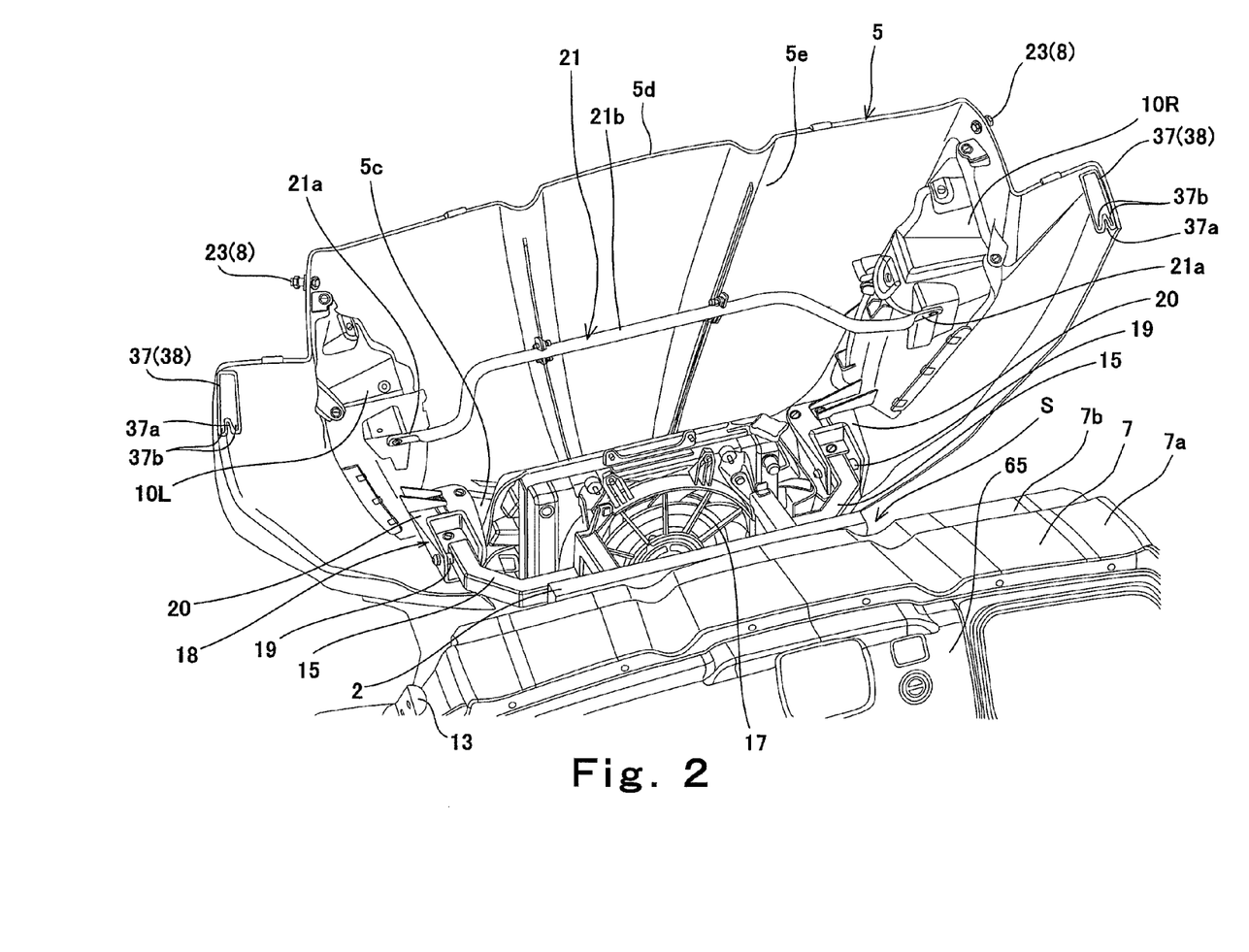
FIG. 2 is a perspective view of a hood in an open position and a region surrounding the hood, as viewed from a driver seat.

FIG. 2 is a perspective view of the hood 5 in an open position and a region surrounding the hood 5, as viewed from the driver seat 9B. As shown in FIG. 2, the hood 5 is coupled at the front end portion 5*c* to the vehicle body frame 2 by hinges 18. In the space S covered with the hood 5, the engine unit and the electric power supply unit are not arranged but a radiator 17 and the suspension unit (not shown) for front wheels are arranged. A pair of stays 15 extending at the right and left sides of the radiator 17 are coupled to the vehicle body frame 2. A rotational shaft 19 having an axis extending in the rightward and leftward direction (vehicle width direction) is provided at the front end portion of each stay 15. A metal-made connecting member 20 is fastened to the front end portion 5*c* of the hood 5 and is rotatably coupled to the rotational shaft 19. That is, the hinge 18 is constituted by the rotational shaft 19 and the connecting member 20.

The head lamp devices 10R and 10L are mounted to the openings 5*a* and 5*b* (see FIG. 1) of the hood 5, respectively, from the direction of the space S. A pipe-shaped support bar 21 which is made of stiff metal is provided to extend between the right and left head lamp devices 10R and 10L. The support bar 21 extends in the rightward and leftward along a surface 5*e* (hereinafter referred to as an inner surface 5*e*) of the hood 5 which is located on the space S side.

Right and left plate-shaped end portions 21*a* of the support bar 21 are fastened to the head lamp devices 10R and 10L, respectively, and an intermediate portion 21*b* of the support bar 21 is fastened to the inner surface 5*e* of the hood 5. Since the head lamp devices 10R and 10L which are relatively heavy components and the flexible hood 5 are supported by the stiff support bar 21, the right and left end portions of the hood 5 are less likely to be displaced downward. Therefore, the shape of the flexible hood 5 is maintained as designed. This makes it possible to prevent the hood 5 from being incompatible with the cover 7, in dimension.

Figure 3A:
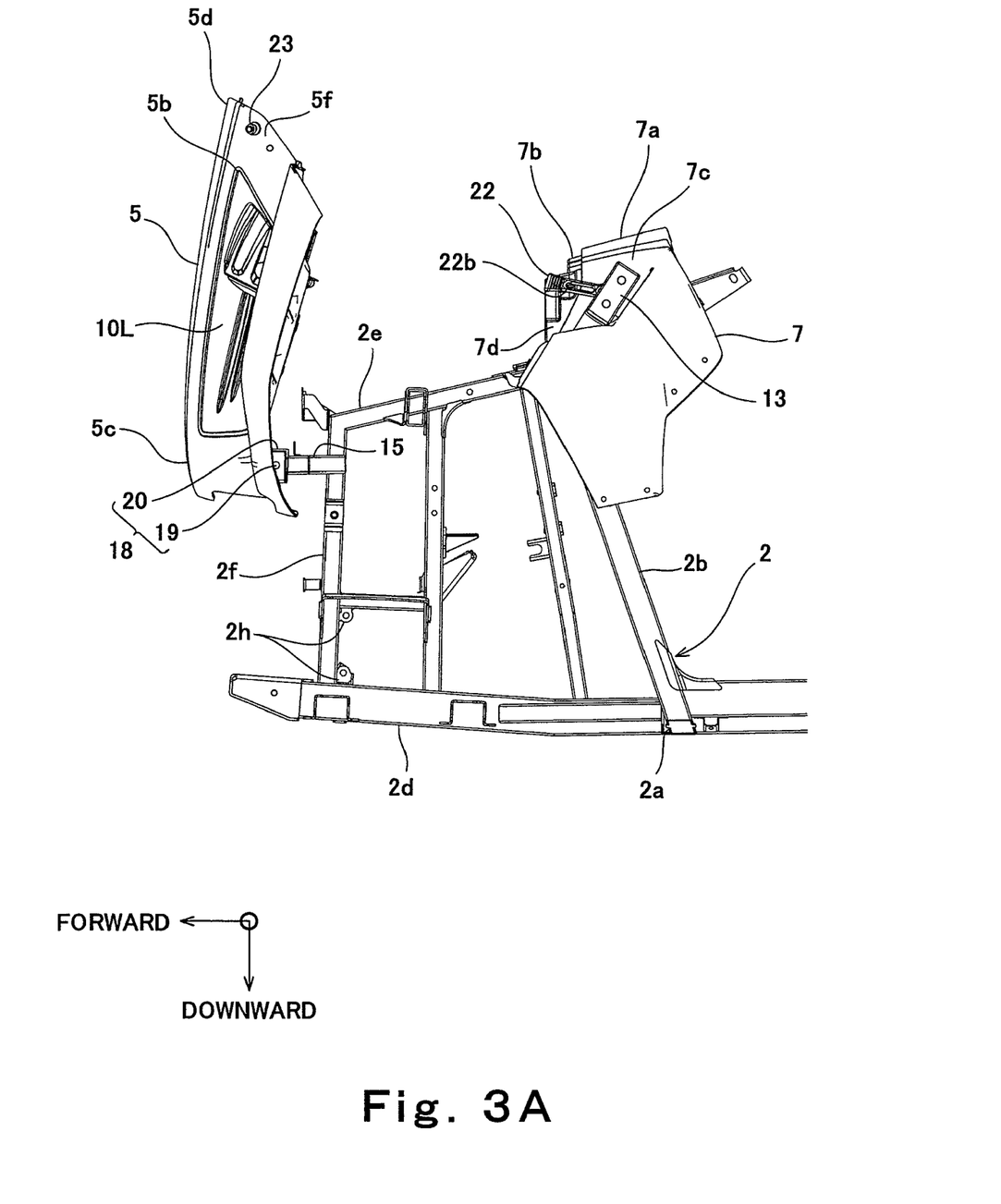
FIG. 3A is a side view of the hood in the open position and the region surrounding the hood.
Figure 3B:
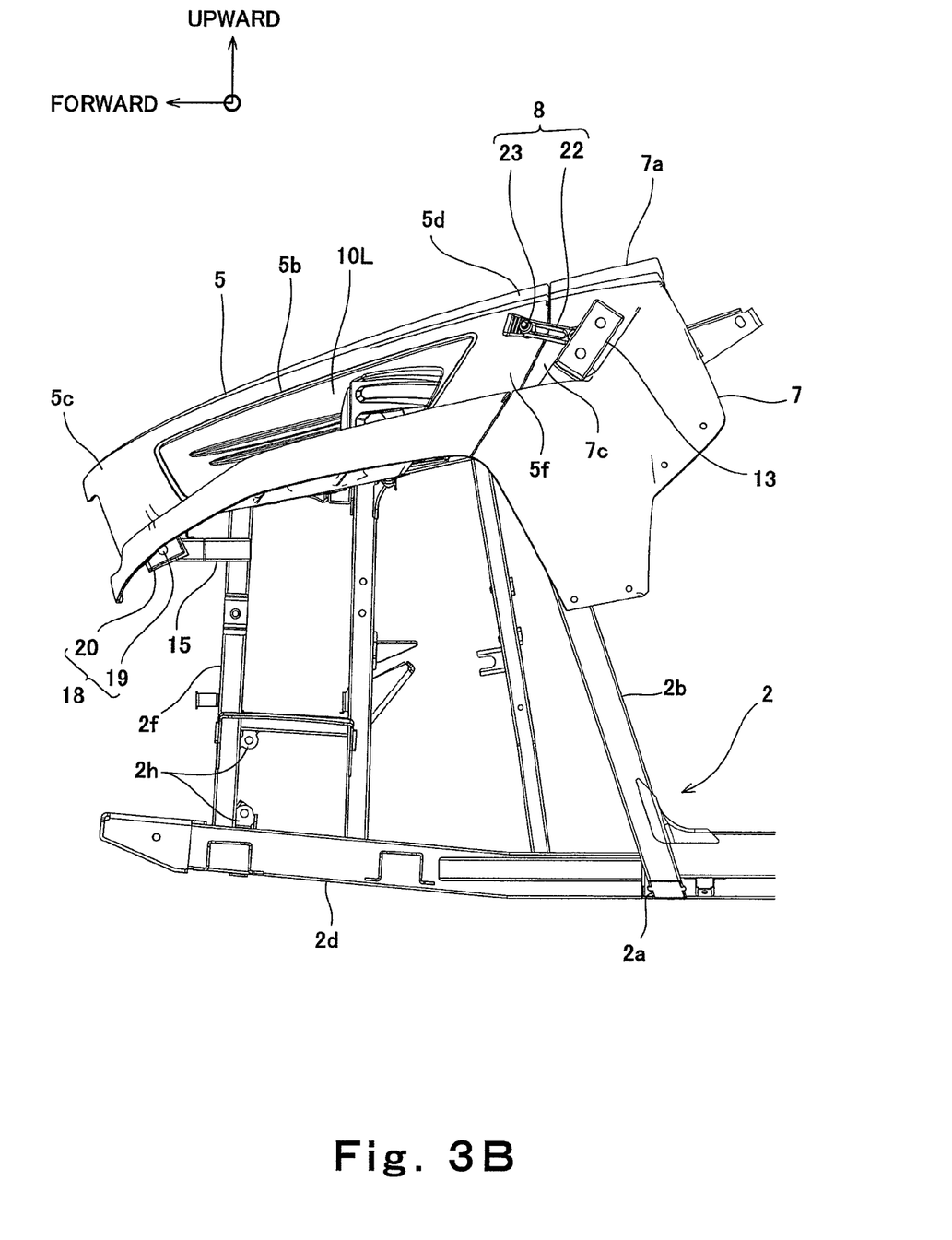
FIG. 3B is a side view of the hood in a closed position and the region surrounding the hood.

FIG. 3A is a side view of the hood 5 in an open position and the region surrounding the hood 5, and FIG. 3B is a side view of the hood 5 in a closed position and the region surrounding the hood 5. As shown in FIG. 3A, the vehicle body frame 2 has a main frame member 2*a* extending in a rightward and leftward direction at the front lower portion thereof. A pair of right and left masts 2*b* are respectively coupled to both ends of the main frame member 2*a* so as to extend upward. The upper end portions of the masts 2*b* are coupled to each other by a cross member 2*c* (see FIG. 6B) extending in the rightward and leftward direction inside the cover 7. The front coupling members 13 are respectively coupled to the end portions of the cross member 2*c* such that the coupling members 13 penetrate through the cover 7 and protrude upward. A pair of right and left front frame members 2*d* extending forward are coupled to the main frame member 2*a*. The cross member 2*c* is coupled to the front frame members 2*d* by a pair of right and left brackets 2*e*. Each front bracket 2*e* has an inverted-L-shape and has an upright member 2*f* which extends upward at a substantially right angle at the front end portion of the front frame member 2*d* to form a forefront portion of the vehicle body frame 2.

Mounting members 2*h* are integrally provided at the lower portion of the upright member 2*f* to couple a suspension frame (not shown) to the vehicle body frame 2. The suspension frame extends substantially laterally from the mounting members 2*h* and the suspension unit (not shown) for front wheels is mounted to the tip end portion of the suspension frame. The stay 15 provided with the rotational shaft 19 protrudes forward from the upright member 2*f*. Therefore, the pivot of the hood 5 is located forward relative to the upright member 2*f* forming the forefront portion of the vehicle body frame 2 and the suspension unit for front wheels. For this reason, with the hood 5 in the open position, the space S between the front wheels 3 is wide open. Therefore, a maintenance operation for the instruments arranged in the space S is easily carried out.

As shown in FIG. 2 and FIG. 3A, the upper surface of the cover 7 and the side surface thereof connected to the upper surface have a step shape. The rear portion 7*a* of the cover 7 forms an upper portion and the front portion 7*b* of the cover 7 forms a lower portion. When the hood 5 is moved down in a rearward direction, the rear end portion 5*d* of the hood 5 covers the front portion 7*b* of the cover 7 and the outer surface of the hood 5 in the closed position is coplanar with the rear portion 7*a* of the cover 7 as shown in FIG. 3B. Thus, the rear end portion 5*d* of the hood 5 is fitted to the front portion 7*b* of the cover 7. In this configuration, the front end portion of the cover is partially covered with the rear end portion of the hood in a state where the hood is in the closed position. This improves the external appearance of the front portion of the utility vehicle 1 with the hood 5 being in the closed position.

After the hood 5 is moved down into the closed position, the stopper mechanisms 8 maintain the attitude of the hood 5. The utility vehicle 1 includes a pair of stopper mechanisms 8 which are symmetric in the rightward and leftward direction. Each stopper mechanism 8 includes a rubber band 22 which is fixed to a side wall portion 7*c* of the rear portion 7*b* of the cover 7 and has an elongated engagement hole, and a projection 23 provided on an outer peripheral surface 5*f* of the hood 5. By engaging the engagement hole of the rubber band 22 with the projection 23, the attitude of the hood 5 is maintained.

Figure 4:
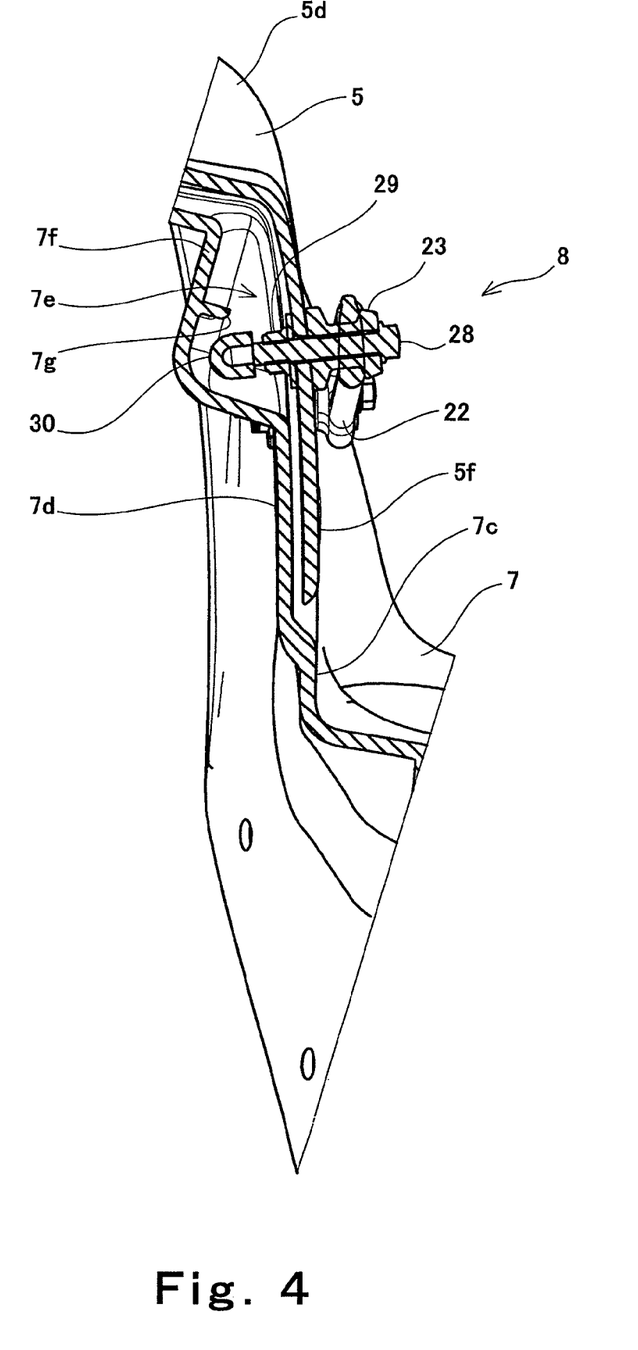
FIG. 4 is a longitudinal sectional view of the rear end portion of the hood retained in the closed position by the stopper mechanism.

FIG. 4 is a longitudinal sectional view of the rear end portion 5*d* of the hood 5 retained in the closed position by the stopper mechanism 8. As shown in FIG. 4, a side wall 7*d* of the front portion 7*b* of the cover 7 covered with the hood 5 in the closed position has a recess 7e recessed toward the center in the rightward and leftward direction. A rib 7g protrudes from a vertical wall 7f defining the recess 7e and extends horizontally within the recess 7e. The tip end portion of a bolt 28 for fastening the projection 23 is located inside the hood 5, and a cap 30 is attached to the tip end portion of the bolt 28.

When the hood 5 is moved down, the rear end portion 5d of the hood 5 covers the front portion 7b of the upper surface of the cover 7 and the connecting portion 7d of the cover 7 as described above. The cap 30 located inside the hood 5 moves into the recess 7e, and moves beyond the rib 7b to a position under the rib 7g. When the utility vehicle 1 is driving off-road with the hood 5 being in the closed position, there is a chance that an external force is exerted on the vehicle body which may cause the rear end portion 5d of the pivotable hood 5 which is a free end to vibrate up and down. In this case, when the rear end portion 5d is about to be displaced upward, the cap 30 is brought into contact with the rib 7g, whereas when the rear end portion 5d is about to be displaced downward, the rear end portion 5d is brought into contact with the front portion 7b of the cover 7. In this way, the vertical displacement of the rear end portion 5d of the hood 5 is restricted, and thus, the hood 5 is less likely to vibrate.

Figure 5:
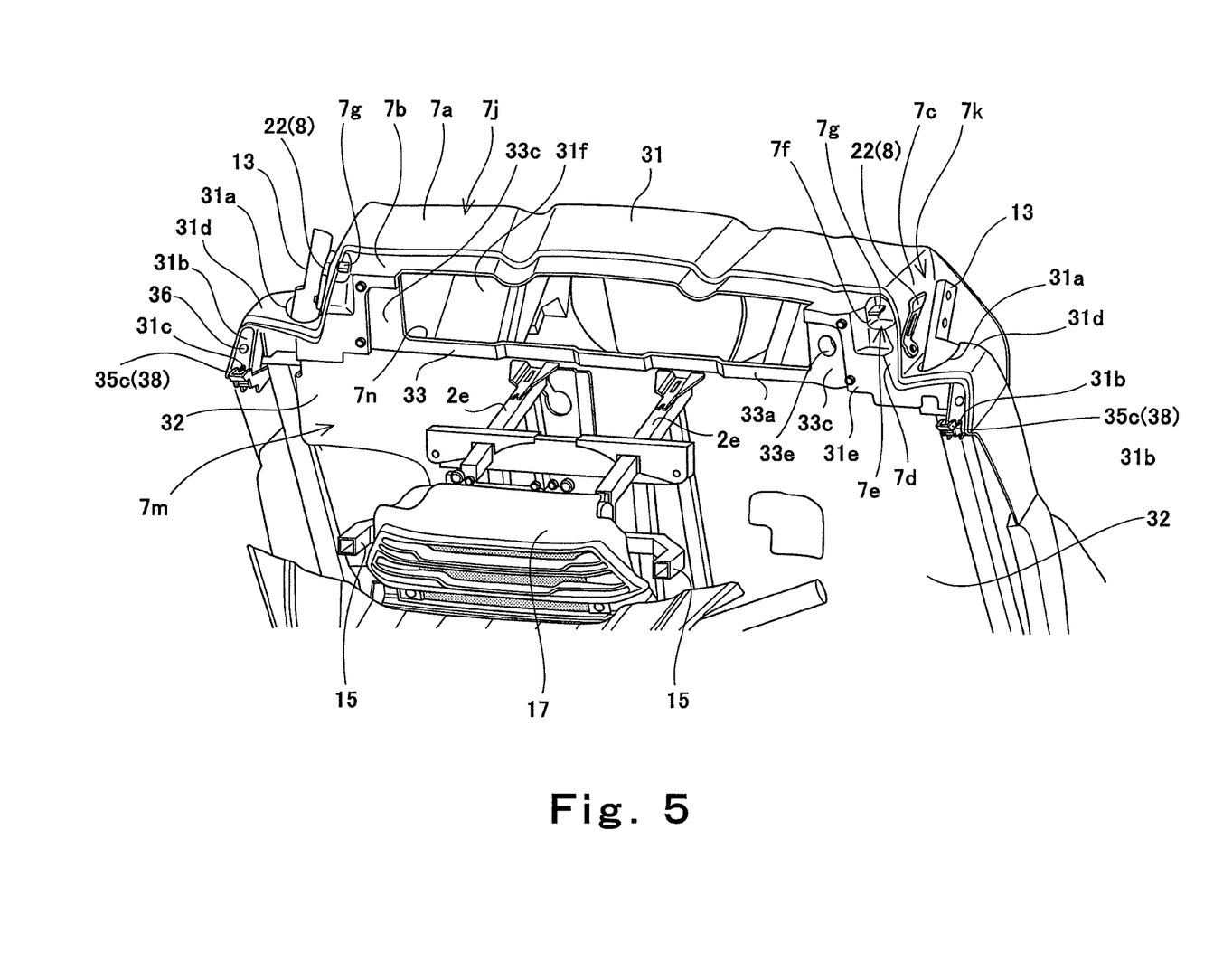
FIG. 5 is a perspective view of a cover as viewed from the front.

FIG. 5 is a perspective view of the cover 7 as viewed from front. As shown in FIG. 5, the cover 7 includes a cover base portion 31, a front panel 32 and a bracket 33 which are attached to each other. The cover base portion 31 has an upper wall 7j and a side wall 7k of the cover 7. The upper wall 7j has the above-described stepped upper surface. The side wall 7k has the side walls 7c and 7d having a step shape, the recess 7e, and others.

The front surface of the cover base portion 31 is wide open. The front panel 32 covers the lower portion of the front surface of the cover base portion 31. A bracket 33 is provided above the front panel 32. The front panel 32 and the bracket 33 form a front wall 7m of the cover 7. Since the cover 7 has the front wall 7m, there is a small chance that mud and other matter may splash into a space below the seats 9 (see FIG. 1) during driving off-road, making it possible to protect the engine unit and the electric power supply unit built into the space from the mud.

Figure 6A:
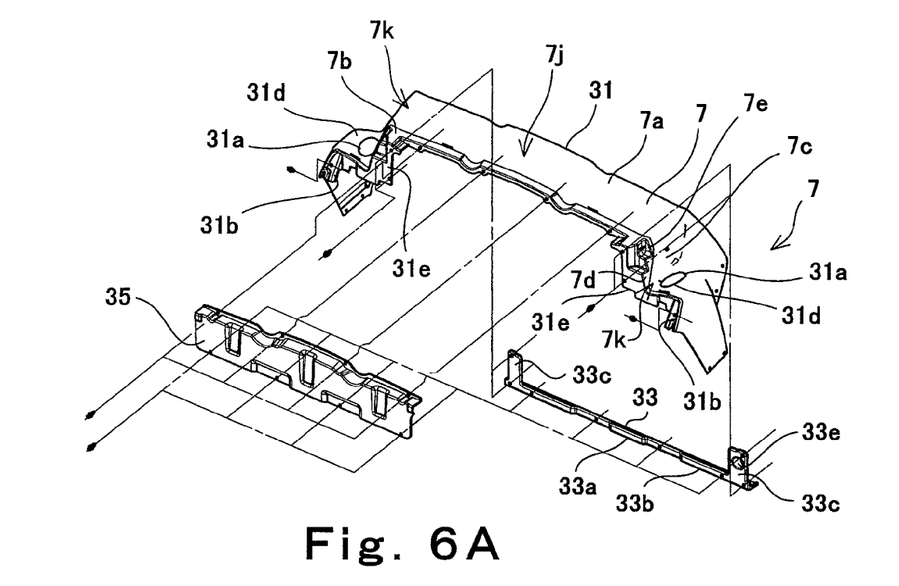
FIG. 6A is an exploded perspective view of the cover as viewed from the front.
Figure 6B:
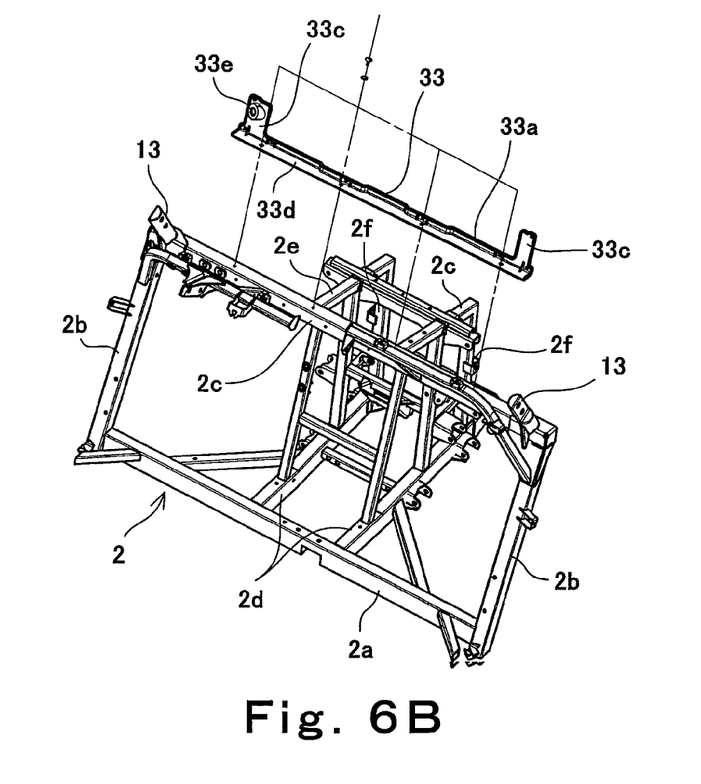
FIG. 6B is an exploded perspective view of the cover as viewed from the rear.

FIG. 6A is an exploded perspective view of the cover 7 as viewed from the front, and FIG. 6B is an exploded perspective view of the cover 7 as viewed from the rear. As shown in FIG. 6A, the cover base portion 31 has protruding walls 31d protruding outward from the side wall 7k to the right and to the left and extending substantially horizontally. Each protruding wall 31d has a through-hole 31a. The front end portion of the upper wall 7j of the cover 7 which is formed by the cover base portion 31 is cut in a rearward direction with a large width to form a cut portion 31f. The cut portion 31f is formed only at the front portion 7b forming the lower portion of the upper surface of the cover 7 so as not to reach the rear portion 7a forming the upper portion.

As show in FIG. 6B, the bracket 33 has a front wall portion 33a forming the front wall 7m of the cover 7. The front wall portion 33a has an extending portion 33b extending in the rightward and leftward direction and vertically extending portions 33c extending vertically upward from the right and left end portions of the extending portion 33b. A stay member 33d extends continuously with the lower end edge of the front wall portion 33a so as to extend at a right angle with respect to the front wall portion 33a. The bracket 33 is fastened to the vehicle body frame 2 in such a manner that the stay member 33d is fastened to the upper surface of the cross member 2c of the vehicle body frame 2.

As shown in FIGS. 6A and 6B, the bracket 33 is fastened to the vehicle body frame 2 and then the cover base portion 31 is mounted to the vehicle body frame 2. In this case, the cover base portion 31 is placed from above and the two front coupling members 13 protruding from the both end portions of the cross member 2c are inserted through the through-holes 31a, respectively. Thereby, the right and left end portions of the vertically extending portions 33c of the bracket 33 are located behind the front wall portions 31e of the cover base portion 31 and are joined to the front wall portions 31e of the cover base portion 31, respectively, in the forward and rearward direction. By inserting the bolts into the portions of the cover base portion 31 and the bracket 33 which are joined to each other in the forward and rearward direction, the bracket 33 is fastened to the cover base portion 31. In a state where the bracket 33 is attached to the cover base portion 31, the right and left inner end edges of the pair of vertically extending portions 33c of the bracket 33 conform to the right and left end edges of the cut portion 31f formed on the upper surface of the cover base portion 31.

Figure 7:
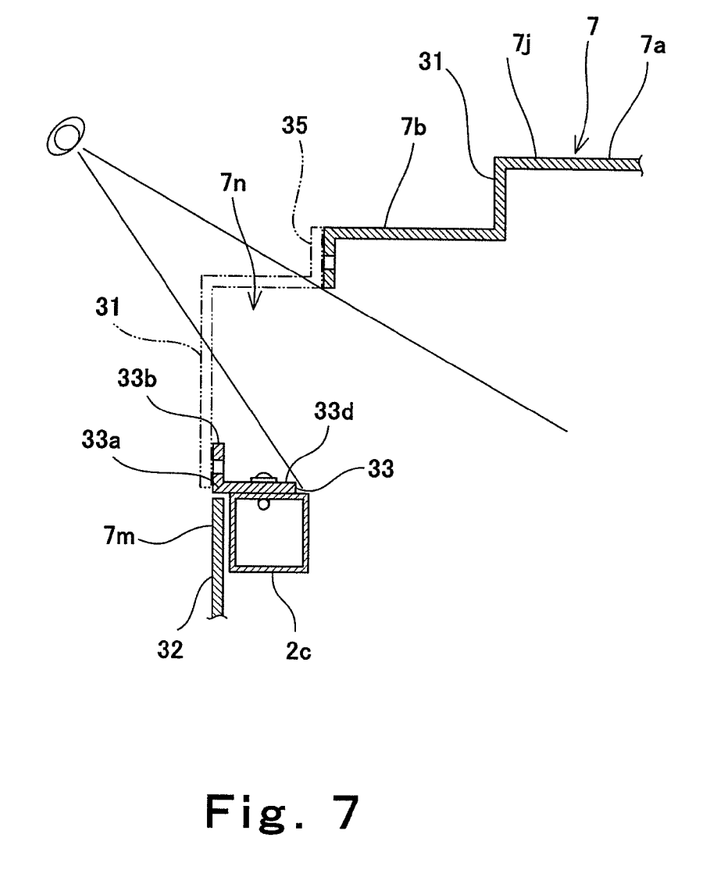
FIG. 7 is a cross-sectional view of a cut portion formed in the cover and a region surrounding the cut portion, as viewed from the side.

FIG. 7 is a partial cross-sectional view of the cut portion 31f and a region surrounding the cut portion 7f, as viewed from the side. As shown in FIGS. 5 and 7, the open portion of a rectangular shape as viewed from the front which is defined by the front wall portion 33a of the bracket 33 is continuous with the open portion of a rectangular shape as viewed from the front which is formed by cutting the cover base portion 31. Thereby, the cover 7 has an open portion 7n which is continuous with the upper wall 7j and the front wall 7m and is inverted-L shaped in cross-section. During normal driving, a lid 35 (see FIG. 6A) is fastened to the cover 7 to close the open portion 7n. By removing the lid 35 by unfastening a threaded member, the user is able to see the back side of the instrument panel 65 (see FIG. 2) or the space below the seats 9 (see FIG. 1) through the open portion 7n from forward. In addition, the user is able to access the engine unit or the electric power supply unit by inserting a hand into the open portion 7n to carry out the maintenance operation. Since the upper wall 7j is cut to make the open portion 7n continuous with the upper wall 7j, a wide region behind the open portion 7n is visible from a location forward and above the open portion 7n, and the region behind the open portion 7n is more easily accessible as compared to a case where the open portion 7n is provided only at the front wall 7m.

The coupling member 13 for coupling the cabin frame 12 (see FIG. 1) to the vehicle body passes through the through-hole 31a of the cover base portion 31 so as not to interfere with the hood 5. On the other hand, because of this structure, in the state where the cabin frame 12 is coupled to the coupling member 13 (see FIG. 1), it is very difficult to detach only the cover base portion 31 from the vehicle body frame 2. In view of this, the cover 7 is formed to have the open portion 7n so that the back side of the instrument panel 65 (see FIG. 2) or the space below the seats 9 (see FIG. 1) is easily visible. As should be understood, the utility vehicle 1 can avoid interference between the hood 5 and the coupling members 13 and make the maintenance operation easier.

The bracket 33 forming the front wall 7m of the cover 7 has a through-hole 33e through which the space below the seats 9 communicates with the space S between the front wheels 3 (see FIG. 5). A harness 63 (see FIGS. 10A and 10B) is provided to pass through the through-hole 33e. By the harness 63, the head lamp devices 10R and 10L (see FIG. 1) provided at the hood 5 are electrically connected to the electric power supply unit built into the space below the seats 9 (see FIG. 1).

As shown in FIGS. 2 and 5, the utility vehicle 1 includes positioning mechanisms 38 for positioning the hood 5 in the closed position with respect to the cover 7. The positioning mechanisms 38 are arranged at the right side and the left side such that they are symmetric in the rightward and leftward direction. Each positioning mechanism 38 includes a slit forming portion 37 (see FIG. 2) provided at the right end or the left end on the inner surface 5e of the rear end portion 5d of the hood 5 and a positioning wall 35c (see FIG. 5) provided at the right side or the left side of the front end portion of the cover base portion 31. The positioning wall 35c protrudes forward from a wall 31b protruding inward at the right or left side of the front end portion of the cover base portion 31. When the hood 5 is moved down into the closed position, the positioning wall 35c provided on the cover 7 is inserted into a slit 37a provided at the slit forming portion 37 so as to open downward, and is sandwiched between the pair of retaining portions 37b of the slit forming portion 37. Thereby, the hood 5 in the closed position is positioned in the rightward and leftward direction with respect to the cover 7, improving the external appearance of the front portion of the utility vehicle 1.

When the utility vehicle 1 is driving off-road with the hood 5 being in the closed position, there is a chance that an external force is exerted on the vehicle body via the front wheels 3 which may cause the rear end portion 5d of the pivotable hood 5 which is a free end to vibrate up and down. However, since the pair of retaining portions 37b provided at the hood 5 tightly sandwich the positioning wall 35c fixed on the cover 7, the vibration of the hood 5 in the rightward and leftward direction is prevented. In this manner, displacement of the hood 5 with respect to the cover 7 can be prevented suitably.

Figure 8:
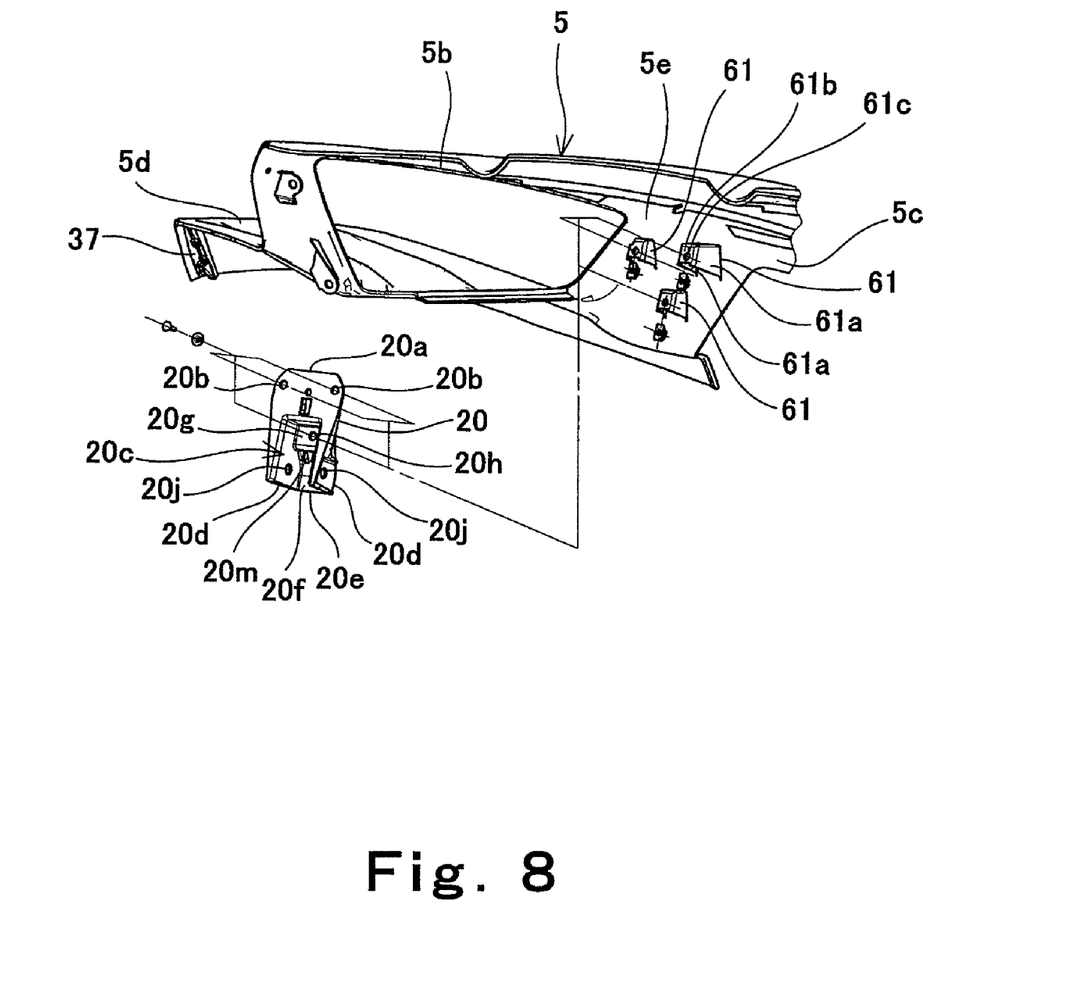
FIG. 8 is an exploded perspective view of a part of the hood before mounting connecting members to the hood.

FIG. 8 is an exploded perspective view of a part of the hood 5 before attaching the connecting member 20 to the hood 5. As shown in FIG. 8, the connecting member 20 forming the hinge 18 (see FIG. 2) as described above is made of metal and is separate from the resin-made hood 5. Plural mounting seats 61 are provided on the inner surface 5e of the hood 5 to mount the connecting member 20 to the hood 5. The number of the mounting seats 61 may be changed as desired. In this embodiment, one set of three mounting seats 61 are illustrated. Two sets of mounting seats 61 are provided at right and left sides at the front end portion of the hood 5. Each mounting seat 61 has a pair of upright portions 61a extending from the inner surface 5e of the hood 5 and a seat portion 61b connecting the tip end portions of the upright portions 61a to each other. The seat portion 61b has a through-hole 61c. Two mounting seats 61 are provided on the back side of the front end portion 5d and one mounting seat 61 is provided on the front side of the front end portion 5d.

The connecting member 20 has a base portion 20a of a flat-plate shape. One end portion of the base portion 20a is supported by the seat portions 61b of the two mounting seats 61 at the back side. Two through-holes 20b are formed on the one end portion of the base portion 20a so as to conform to the through-holes 61c of the two seat portions 61b, respectively. The base portion 20a has at the other end portion thereof a recess 20c for receiving the front end portion of the stay 15 (see FIG. 2). The recess 20c is defined by a pair of side walls 20d extending vertically from the base portion 20a, and a bottom wall 20e connecting the side walls 20d to each other. Thus, the recess 20c is U-shaped in cross-section.

The bottom wall 20e has a step shape and includes a first bottom wall 20f at the front side of the bottom wall 20e and a second bottom wall 20g at the back side. The first bottom wall 20f is recessed with a larger amount with respect to the base portion 20a than the second bottom wall 20g. The front end portion of the stay 15 (see FIG. 2) is received in the front side of the recess with a larger recess amount. A through-hole 20j is provided at the front side of each side wall 20d. By inserting the rotational shaft 19 (see FIG. 2) into the through-holes 20j, the connecting member 20 is mounted to the stay 15 (see FIG. 2) received in the recess 20c. The second bottom wall 20g is supported on the seat portion 61b of the mounting seat 61 on the front side. The second bottom 20f has a through-hole 20h conforming to the through-hole 61c of the seat portion 61b. Plural ribs 20m protrude from a connecting wall 20k (see FIG. 9A) connecting the first bottom wall 20f to the second bottom wall 20g.

The connecting member 20 is fastened to the hood 5 by placing the rear surface of the base portion 20a and the rear surface of the second bottom wall 20g on the associated seat portion 61b and inserting a bolt into the through-hole. The mounting seat 61 has the upright portion 61a. The seat portion 61b on which the connecting member 20 is placed is distant from the inner surface 5e of the hood 5. Although the first bottom wall 20f is recessed with a larger amount with respect to the base portion 20a to receive the stay 15 (see FIGS. 13A and 13B), the rear surface of the first bottom wall 20f will not interfere with the inner surface 5e of the hood 5.

Figure 9A:
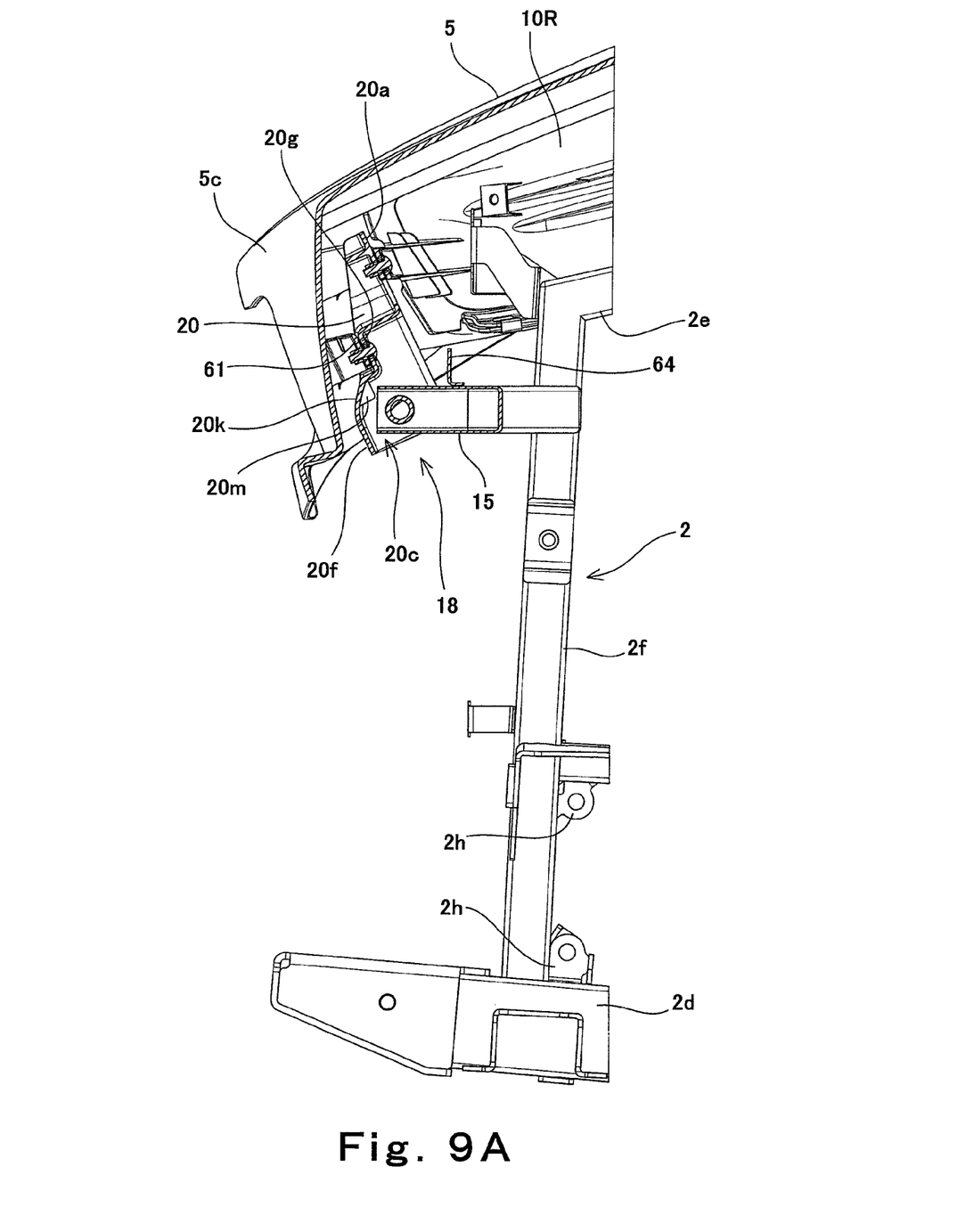
FIG. 9A is a partial cross-sectional view of the hood in the closed position and the region surrounding the hood, as viewed from the side.
Figure 9B:
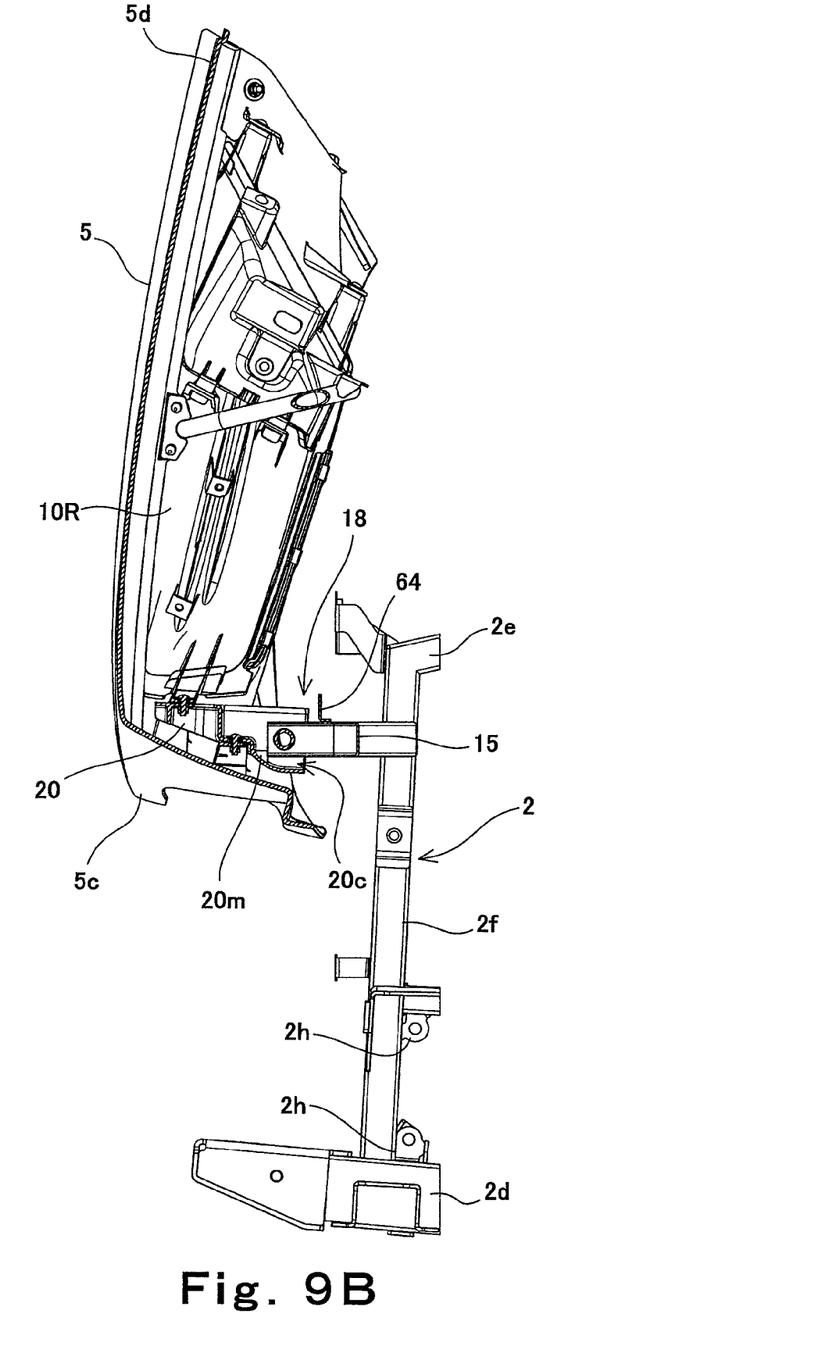
FIG. 9B is a partial cross-sectional view of the hood in the open position and the region surrounding the hood, as viewed from the side.

FIG. 9A is a partial cross-sectional view of the hood 5 in the closed position and the region surrounding the hood 5, as viewed from the side, and FIG. 9B is a partial cross-sectional view of the hood 5 in the open position and the region surrounding the hood 5, as viewed from the side. As shown in FIG. 9A, in the state where the hood 5 is in the closed position, the rib 20m of the connecting member 20 is positioned forward and above relative to the pivot, and the front end surface of the stay 15 is distant from the rib 20m. Under this state, when the hood 5 is pivoted to the open position, the connecting member 20 is pivoted around the pivot together with the hood 5. In this case, the rib 20m of the connecting member 20 moves downward through a region forward of the stay 15.

As shown in FIG. 9B, when the hood 5 continues to be pivoted to be placed into the open position, the rib 20m contacts the lower portion of the front end surface of the stay 15 in a state where the hood 5 is in a substantially upright position. Since the rib 20m cannot be pivoted around the lower side of the stay 15, the hood 5 cannot be pivoted further forward.

In the above-described manner, the pivot operation of the hood 5 toward the open position is restricted by the cooperation of the rib 20m of the connecting member 20 and the stay 15. Thus, connecting member 20 functions as a restricting member that is provided at the hood and configured to cooperate with the vehicle body frame 2 to restrict a pivot operation of the hood 5. It will be appreciated that rib 20m is one of plural ribs 20m that may be included in the restricting member. Each of the plural ribs 20m may be provided to extend from an inner surface of the hood 5 in a direction that is substantially perpendicular to the inner surface. The pivot operation of the hood 5 is restricted in such a manner that the plural ribs 20m are configured to contact a frame member of the vehicle body frame 2 which is disposed in the space between the front wheels 3 by pivoting the hood 5. In this restricted state, it is desired that the hood 5 be subjected to a rotational moment generated by the weight of the hood 5 to cause the hood 5 to be pivoted forward. Since the rotational moment is supported by the stay 15 in contact with the rib 20m, the hood 5 maintains the open position if the user releases the hand from the hood 5. Thus, it is possible to avoid that the hood 5 is inadvertently moved down in a rearward direction.

In this state, as shown in FIG. 9B, the pivot operation of the hood 5 is restricted while maintaining the substantially upright position. This reduces the load to be supported by the stay 15. Therefore, it is not necessary to improve stiffness of the stay 15 and the rib 20m. In this embodiment, the connecting member 20 is separate from the resin-made hood 5 and is made of a stiff metal material. This enables the connecting member 20 to have sufficient stiffness to support the load.

The resin-made hood 5 can be easily integrally formed to have a complex shape. In a case where the rib 20m for restricting the pivot operation of the hood 5 is formed integrally with the hood 5 using resin, it is desirable to form the rib 20m in a solid state to ensure stiffness. However, if the solid rib is caused to protrude from the inner surface 5e of the resin-made hood 5 manufactured by molding, there is a chance that a groove is generated at a portion of the outer surface of the hood 5 where the rib 20b is formed. In this embodiment, since the rib 20m is separate from the hood 5, it is possible to prevent that such a groove is generated on the outer surface of the hood 5. As a result, the external appearance of the hood 5 will not be degraded.

Although in this embodiment, the rib 20m is provided integrally with or separately from the hood 5 to restrict the pivot operation of the hood 5, any other member may be used so long as it is capable of cooperating with the stay 15 to restrict the pivot operation of the hood 5. For example, instead of the rib 20m, a block-shaped part may be provided integrally with or separately from the hood 5.

Figure 10A:
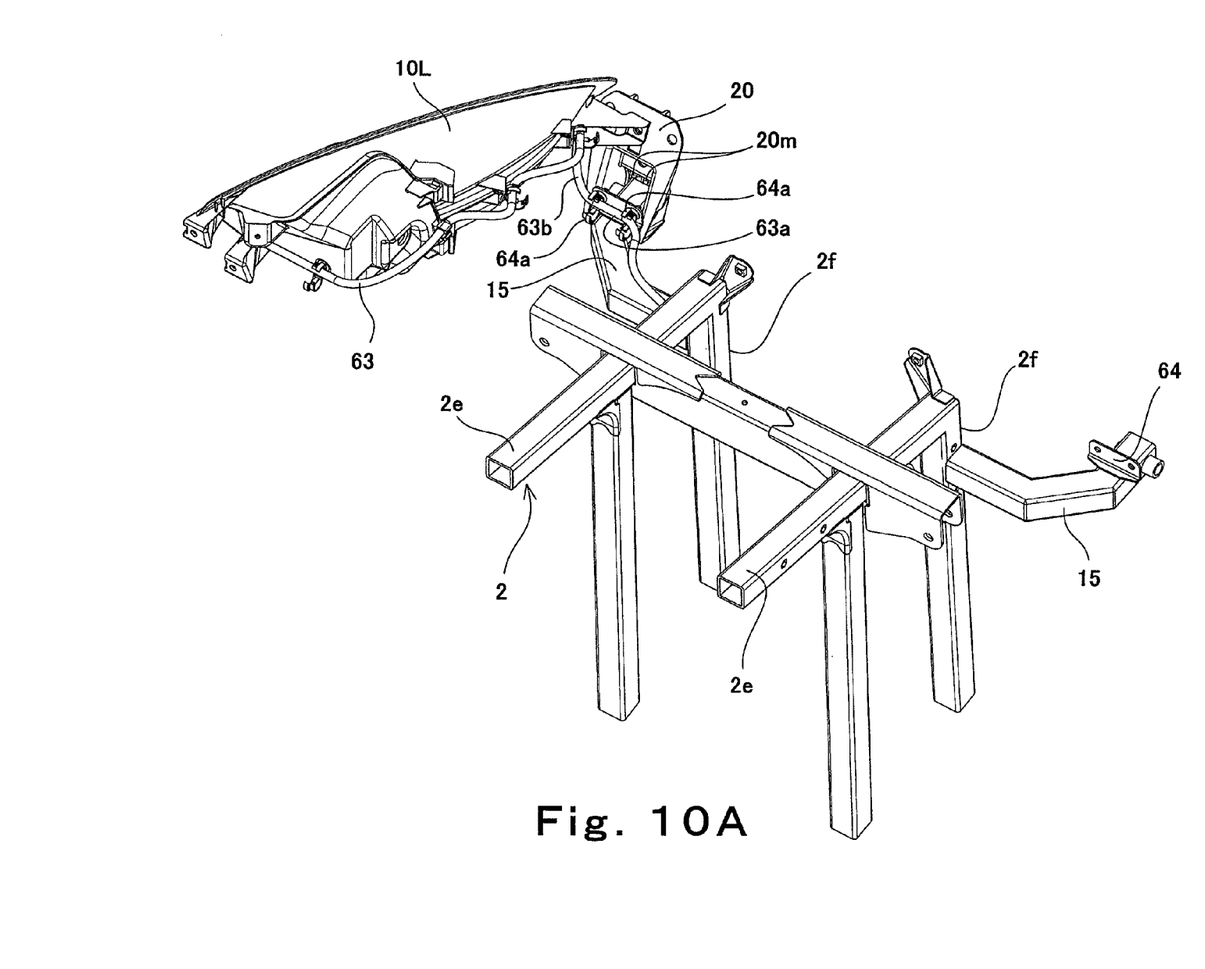
FIG. 10A is a perspective view showing arrangement of a harness in the state where the hood is in the closed position.
Figure 10B:
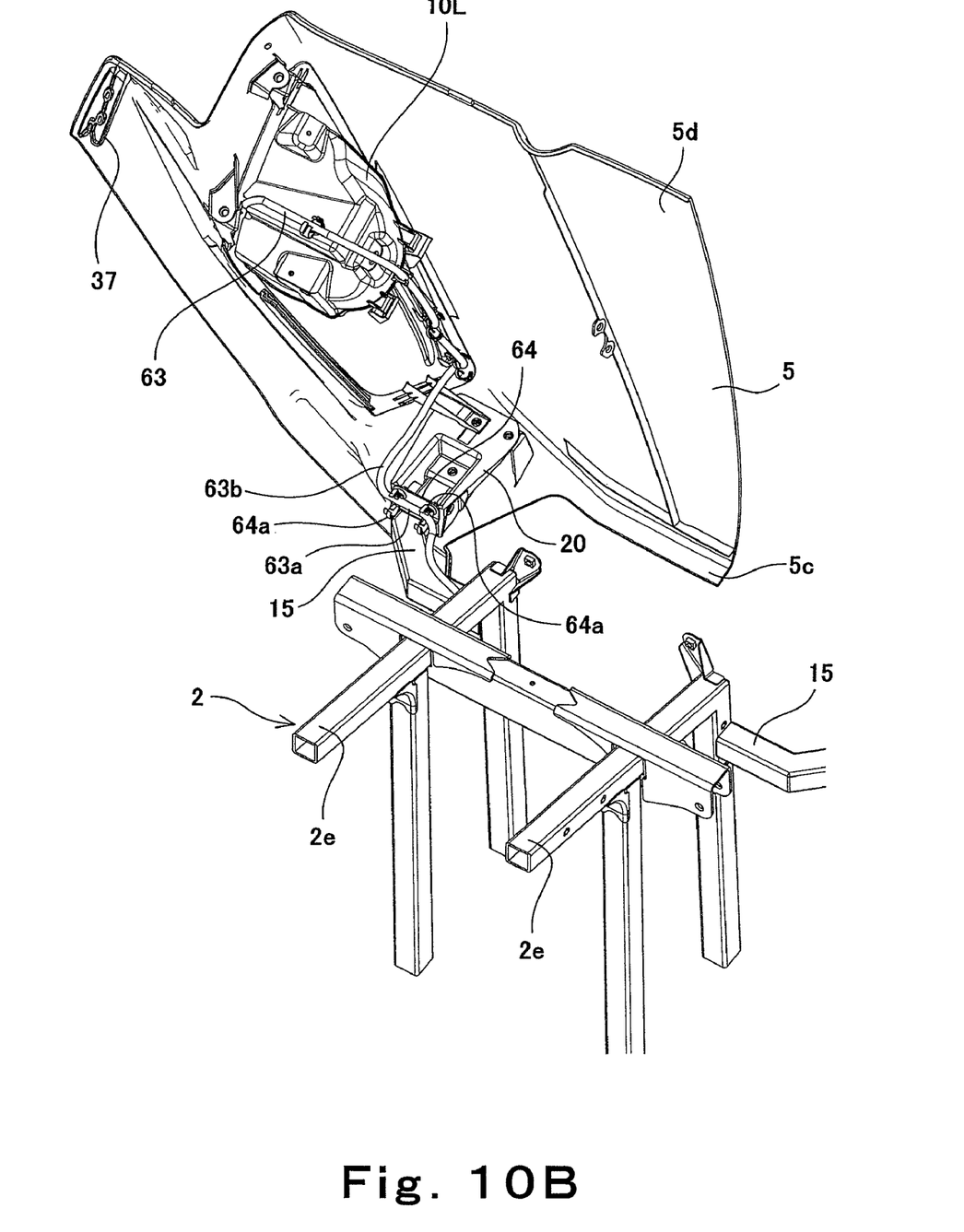
FIG. 10B is a perspective view showing arrangement of the harness in the state where the hood is in the open position.

FIG. 10A is a perspective view showing arrangement of a harness 63 in the state where the hood 5 is in the closed position, and FIG. 10B is a perspective view showing arrangement of the harness 63 in the state where the hood 5 is in the open position. As shown in FIG. 10A, the harness 63 is connected to the head lamp device 10L. Electric power is supplied from the electric power supply unit (not shown) built in the space below the seats 9 (see FIG. 1) through the harness 63. A harness retaining member 64 for retaining the harness 63 is attached on the upper surface of the stay 15. The harness retaining member 64 is attached with two clips 64a at the right and left sides, respectively. The two clips 64a serve to retain the harness 63. The harness 63 includes a fixed portion 63a retained by the harness retaining member 64 and fixed to the vehicle body frame 2 side and a pivot portion 63b extending continuously with the fixed portion 63a and coupled to the head lamp device 10L. The fixed portion 63a is fixed to the vehicle body frame 2 side so as to extend in the rightward and leftward direction based on the arrangement of the two clips 64a. That is, the axial direction of the fixed portion 63a conforms to the axial direction of the rotational shaft 19 (see FIG. 2).

With reference to FIGS. 10A and 10B, the pivot portion 63b of the harness 63 is pivoted around the axis of the fixed portion 63a according to the pivot operation of the hood 5. According to the pivot operation, the pivot portion 63b of the harness 63 is twisted with respect to the fixed portion 63a. This reduces a chance that the harness 63 is cut.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a vehicle body frame;
a cabin frame coupled to an upper portion of the vehicle body frame;
a cover coupled to the vehicle body frame so as to cover an instrument panel in front of a driver seat; and
a hood which is configured to cover a space between a pair of right and left front wheels from above in front of the cover and is pivotable around a front end portion of the hood so as to open and close, wherein a rear end portion of the hood is fitted to a front end portion of the cover and a rear end of the hood is located in front of a front end of the cabin frame, in a state where the hood is in a closed position;
wherein the front end portion of the cover is partially covered with the rear end portion of the hood in a state where the hood is in the closed position;
wherein the cover has a front wall and an upper wall, and an open portion is provided in a part of a portion of the front wall and the upper wall which is covered with the hood in the closed position; and
wherein a lid is attached to the cover to close the open portion such that the lid is openable and closable or removable.

2. The utility vehicle according to claim 1,
wherein the vehicle body frame is provided with a coupling member to which the front end of the cabin frame is coupled, the coupling member penetrating the cover and protruding upward.

3. The utility vehicle according to claim 1,
wherein the upper wall of the cover and the front wall of the cover are separate from each other, and the front wall has a through-hole through which a harness passes through from a space on a driver seat side to the space formed between the front wheels.

4. The utility vehicle according to claim 1,
wherein the open portion is continuous with the front wall and the upper wall and has an inverted-L shaped cross-section as viewed from a side.

5. A utility vehicle comprising:
a vehicle body frame;
a cabin frame coupled to an upper portion of the vehicle body frame;
a cover coupled to the vehicle body frame so as to cover an instrument panel in front of a driver seat; and
a hood which is configured to cover a space between a pair of right and left front wheels from above in front of the cover and is pivotable around a front end portion of the hood so as to open and close, wherein a rear end portion of the hood is fitted to a front end portion of the cover and a rear end of the hood is located in front of a front end of the cabin frame, in a state where the hood is in a closed position; and
a restricting member provided at the hood, and configured to cooperate with the vehicle body frame to restrict a pivot operation of the hood;
wherein the restricting member includes plural ribs provided to extend from an inner surface of the hood, and the pivot operation of the hood is restricted in such a manner that the plural ribs are configured to contact a frame member of the vehicle body frame which is disposed in the space between the front wheels by pivoting the hood.

6. A utility vehicle comprising:
a vehicle body frame;
a cabin frame coupled to an upper portion of the vehicle body frame;
a cover coupled to the vehicle body frame so as to cover an instrument panel in front of a driver seat; and
a hood which is configured to cover a space between a pair of right and left front wheels from above in front of the cover and is pivotable around a front end portion of the hood so as to open and close, wherein a rear end portion of the hood is fitted to a front end portion of the cover and a rear end of the hood is located in front of a front end of the cabin frame, in a state where the hood is in a closed position; and
a restricting member provided at the hood, and configured to cooperate with the vehicle body frame to restrict a pivot operation of the hood;
wherein the restricting member is separate from the hood.

7. A utility vehicle comprising:
a vehicle body frame;
a cabin frame coupled to an upper portion of the vehicle body frame;
a cover coupled to the vehicle body frame so as to cover an instrument panel in front of a driver seat; and
a hood which is configured to cover a space between a pair of right and left front wheels from above in front of the cover and is pivotable around a front end portion of the hood so as to open and close, wherein a rear end portion of the hood is fitted to a front end portion of the cover and a rear end of the hood is located in front of a front end of the cabin frame, in a state where the hood is in a closed position;
a head lamp device fastened to the hood;
a harness electrically connected to the head lamp device; and
a harness retaining member configured to retain the harness with respect to the vehicle body frame;
wherein the harness includes a fixed portion fixed to the vehicle body frame by the harness retaining member and a pivot portion which extends continuously with the fixed portion and is coupled to the head lamp device; and
wherein the pivot portion is pivotable around an axis of the fixed portion according to a pivot operation of the hood.

8. A utility vehicle comprising:
a vehicle body frame;
a cabin frame coupled to an upper portion of the vehicle body frame;
a cover coupled to the vehicle body frame so as to cover an instrument panel in front of a driver seat; and
a hood which is configured to cover a space between a pair of right and left front wheels from above in front of the cover and is pivotable around a front end portion of the hood so as to open and close, wherein a rear end portion of the hood is fitted to a front end portion of the cover and a rear end of the hood is located in front of a front end of the cabin frame, in a state where the hood is in a closed position;
wherein the vehicle body frame includes a suspension frame for supporting a suspension for front wheels disposed at a front portion of the vehicle and a stay protruding forward from the suspension frame; and
wherein the front end portion of the hood is coupled to a tip end of the stay such that the hood is pivotable around the front end portion.

* * * * *